(12) United States Patent
Starken

(10) Patent No.: US 7,875,838 B1
(45) Date of Patent: Jan. 25, 2011

(54) POST BOOST CONTROL POWER ASSEMBLY

(75) Inventor: George M. Starken, Chestertown, MD (US)

(73) Assignee: The United States of America as represented by The Secretary of the Navy, Washington, DC (US)

(*) Notice: Subject to any disclaimer, the term of this patent is extended or adjusted under 35 U.S.C. 154(b) by 329 days.

(21) Appl. No.: 11/732,668

(22) Filed: Apr. 4, 2007

(51) Int. Cl.
*F42B 15/01* (2006.01)
*B64G 1/42* (2006.01)
*F42B 15/00* (2006.01)

(52) U.S. Cl. ............... 244/3.22; 244/1 R; 244/3.1; 244/3.15; 244/3.21; 244/158.1; 244/164; 244/169

(58) Field of Classification Search ........... 244/3.1–3.3, 244/158.1, 164–171.6, 1 R; 60/200.1, 228, 60/229, 251–256; 102/374–381, 530, 531; 239/265.11–265.43
See application file for complete search history.

(56) References Cited

U.S. PATENT DOCUMENTS

| | | | |
|---|---|---|---|
| 3,645,475 A * | 2/1972 | Stripling | 244/3.22 |
| 3,736,749 A * | 6/1973 | Kretschmer et al. | 60/229 |
| 4,550,888 A | 11/1985 | Douglass et al. | 244/3.22 |
| 5,062,593 A * | 11/1991 | Goddard et al. | 244/169 |
| 5,111,553 A * | 5/1992 | Muggeridge et al. | 244/3.22 |
| 7,118,065 B1 * | 10/2006 | Heitmann et al. | 244/3.22 |
| 7,416,154 B2 * | 8/2008 | Bittle et al. | 244/3.22 |

* cited by examiner

*Primary Examiner*—Bernarr E Gregory
(74) *Attorney, Agent, or Firm*—John Tarlano

(57) ABSTRACT

A tubular distributor in a missile having a right-angled hollow tubular first section, the right-angled hollow tubular first section having a first leg and a second leg, a straight hollow tubular second section, an end of the first leg of the right-angled hollow tubular first section perpendicularly connected to a first end of the hollow tubular second section, a straight hollow tubular third section, a first end of the hollow tubular third section perpendicularly connected to the first end of the straight hollow tubular second section, and a close/open valve positioned within the straight hollow tubular third section, the close/open valve positioned between a gas generator and the straight hollow tubular second section.

4 Claims, 1 Drawing Sheet

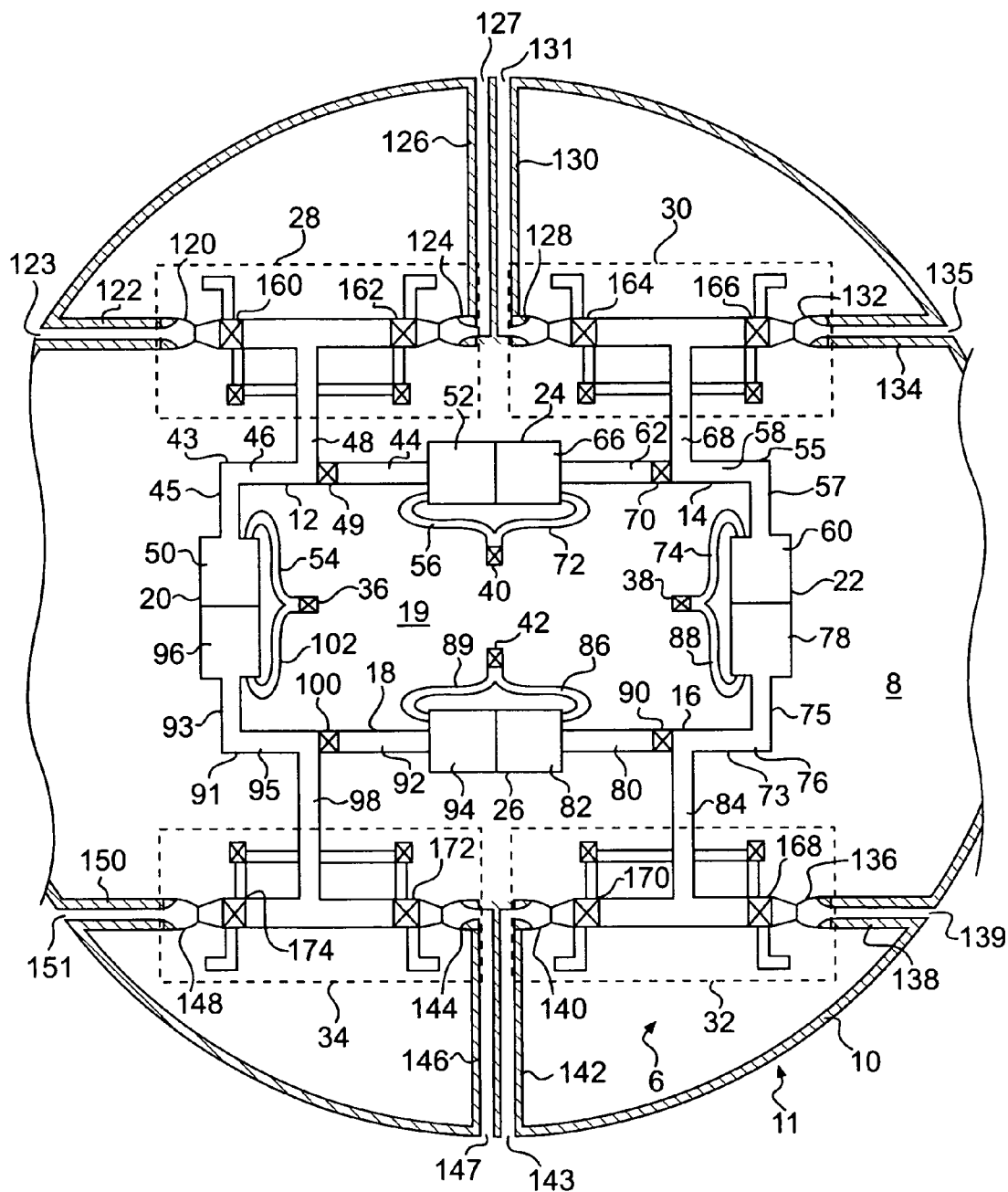

POST BOOST CONTROL POWER ASSEMBLY

BACKGROUND OF THE INVENTION

In the past, a post boost control power assembly had a manifold that distributed gas to several integrated thruster valve assemblies. Such a manifold is shown in U.S. Pat. No. 4,550,888. In the '888 patent, the gas was enclosed in the manifold, before the gas was sent from the manifold into the integrated valve assemblies. The gas was used to produce forces on the integrated thruster valve assemblies, as the gas passed out of the integrated thruster valve assemblies. The forces were uses to control position, attitude and velocity of a final stage of a multi-stage rocket.

The manifold of the '888 patent obtained gas from a gas generator. Heat was lost from the gas, since the gas was sent through the manifold. The loss of heat from the gas, causing the gas to produce less powerful forces than might be needed for proper propulsion for position, attitude and velocity control. The cooled gases were sent to integrated thruster valve assemblies from the manifold.

SUMMARY OF THE INVENTION

The disclosed post boost control power assembly has tubular gas distributors. Each tubular gas distributor is connected to two gas generators. Each tubular gas distributor is also connected to an integrated thruster valve assembly. Each tubular gas distributor sends gas directly from a connected gas generator into a single integrated thruster valve assembly. Since gas passes directly through the tubular gas distributor, the gas remains at a high temperature. There is minimal heat loss from the gas that passes through the tubular gas distributor.

The gas that passed through a tubular gas distributor produces a more powerful force than is the force that is produced by gas that comes from a manifold, since there is less heat loss from the disclosed post boost control power assembly than from a past post boost control power assembly.

The disclosed tubular gas distributor has three ports. A gas generator is connected to a first port of the tubular gas distributor. An integrated thruster valve assembly is connected to a second port of the tubular gas distributor. Another gas generator is connected to a third port of the tubular gas distributor.

The disclosed post boost control power assemble has tubular gas distributors, dual gas generators, integrated thruster valve assembles, igniters for igniting each of the dual gas generators and close/open valves. The disclosed post boost power control system forms a loop of tubular gas distributors within an aft section of a body of a missile.

Each dual gas generator has two single gas generators. The two single gas generators are joined to form the dual gas generator. Each single gas generator has gas generating material. The two single gas generators are joined together, with the gas generating material separated by a bulkhead wall, to form a dual gas generator. The gas generating material within a single gas generator only burns up to the bulkhead wall. The dual gas generator has two ports, one port for each of the two single gas generators.

Gas from four single gas generators, the four gas generators being within two dual gas generators, is sent through four triple port tubular gas distributors during a first phase. Other gas from four other single gas generators, the latter four gas generators being within two other dual gas generators, is sent through the same four triple port tubular gas distributors during a second phase.

Four close/open valves are closed so that gas from a first four generators, within two dual gas generators, is sent into the four triple port tubular gas distributors during the first phase. The four close/open valves are opened, so that other gas from a second four gas generators, within two other dual gas generators, is sent into the four triple port tubular gas distributors during the second phase.

The use of four tubular gas distributors in a post boost control power assembly provides for less heat loss from gas coming from four single gas generators, than does a post boost control power assembly that uses a manifold connected to the four single gas generators. Therefore greater efficiency in position, attitude and velocity control is produced by the disclosed post boost control power assembly than was available in the past, since the force produced by gas from the tubular gas distributors is greater, and of longer duration, than is a force produced by gas that passes through a manifold.

A benefit of the tubular gas distributors, as compared to the prior art manifold, is enhanced by a bulkhead inserted in the center of each dual gas generator. The bulkhead within each dual gas generator allows for eight gas generators being within the disclosed post boost control power assembly.

Four gas generators, within two of the four dual gas generators, supplies gas during a first time period. Then another four gas generators, within two other dual gas generators, supplies gas during a second time period.

The disclosed post boost control power assembly provides hot gases for use by integrated thruster valve assemblies. The hot gases are used to change the position, attitude and velocity of a final stage of a multi-stage rocket.

The combined tubular gas distributor, close/open valve and first and second gas generator provide for a more direct gas flow to an integrated thruster valve assembly, than is provided to an integrated thruster valve assembly by a combined manifold and single gas generator. Further, the gas pressure decrease, due to heat loss, is lessened by use of a gas distributor rather than a manifold.

DESCRIPTION OF THE DRAWING

FIGURE is a diagrammatic view, looking aft, of a post boost control power assembly, the post boost control assembly being located within a missile.

DESCRIPTION OF THE PREFERRED EMBODIMENT

FIGURE shows a post boost control power assembly 6. The assembly 6 is connected to an aft section 8 of a missile body 10 of a missile 11. The assembly 6 has four tubular gas distributors 12, 14, 16 and 18. The assembly 6 has four dual gas generators 20, 22, 24 and 26. The assembly 6 has four integrated thruster valve assemblies 28, 30, 32 and 34. Four ignition igniters 36, 38, 40 and 42 are connected to the four dual gas generators 20, 22, 24 and 26.

The assembly 6 forms a loop 19 of four tubular gas distributors 12, 14, 16 and 18 within aft section 8 of missile body 8. The loop 19 is made possible due to a shape of each of the tubular gas distributor 12, 14, 16 and 18.

Tubular gas distributor 12 has three hollow tubular sections, namely a right-angled hollow tubular first section 46, a hollow tubular second section 48 and a hollow tubular third section 44. The tubular gas distributor 12 has a gas flow close/open valve 49 that is located within hollow tubular third section 44. Hollow tubular sections 44, 46 and 48 are made as short as possible, to reduce heat loss from gases that pass through the hollow tubular sections 44, 46 and 48 of gas distributor 12. The hollow tubular sections 44, 46 and 48 of tubular gas distributor 12 are round tubes. The hollow tubular sections 44, 46 and 48 of gas distributor 12 could alternately be rectangular tubes or square tubes.

The right-angled hollow tubular first section 46 has a first leg 43 and a second leg 45. First leg 43 and second leg 45 are mutually perpendicular. The right-angled tubular first section 58 has a first leg 55 and a second leg 57. First leg 55 and second leg 57 are mutually perpendicular. The right-angled tubular first section 76 has a first leg 73 and a second leg 75. First leg 73 and second leg 75 are mutually perpendicular. The right-angled tubular first section 95 has a first leg 91 and a second leg 93. First leg 91 and second leg 93 are mutually perpendicular.

A dual ignition cord igniter 36 is connected to dual port gas generator 20. A dual ignition cord igniter 38 is connected to dual port gas generator 22. A dual ignition cord igniter 40 is connected to dual port gas generator 24. A dual ignition cord igniter 42 is connected to dual port gas generator 26.

Section 46 of tubular gas distributor 12 is connected to a gas generator 50 of dual gas generator 20. Section 44 of gas distributor 12 is connected to gas generator 52 of dual gas generator 52. Section 48 of gas distributor 12 is connected to integrated thruster valve assemble 28. An ignition cord 54 of ignition igniter 36 is connected gas generator 50. An ignition cord 56 of igniter 40 is connected to a gas generator 52 of dual gas generator 24. A gas flow close/open valve 49 is located within section 44 of the gas distributor 12.

Section 58 of tubular gas distributor 14 is connected to gas generator 60 of dual port gas generator 22. Section 62 of gas distributor 14 is connected to gas generator 66 of dual gas generator 24. Section 68 of gas distributor 14 is connected to integrated thruster valve assembly 30. A gas flow close/open valve 70 is located within section 62 of gas distributor 14. An ignition cord 72 of igniter 40 is connected to gas generator 66. An ignition cord 74 of igniter 38 is connected to gas generator 60 of dual gas generator 22.

Section 76 of tubular gas distributor 16 is connected to gas generator 78 of dual gas generator 22. Section 80 of gas distributor 16 is connected to gas generator 82 of dual gas generator 26. Section 84 of gas distributor 16 is connected to integrated thruster valve assembly 32. An ignition cord 86 of igniter 42 is connected to gas generator 82 of dual gas generator 26. An ignition cord 88 of igniter 38 is connected to gas generator 78 of dual gas generator 22. A gas flow close/open valve 90 is located within section 80 of gas distributor 16.

A section 92 of tubular gas distributor 18 is connected to gas generator 94 of dual gas generator 26. A section 95 of gas distributor 18 is connected gas generator 96 of dual gas generator 20. A section 98 of gas distributor 18 is connected to integrated thruster valve assembly 34. A gas flow close/open valve 100 is connected within section 92 of gas distributor 18. An ignition cord 89 of igniter 42 is connected to gas generator 94 of dual gas generator 26. An ignition cord 102 of igniter 36 is connected to gas generator 96 of dual gas generator 20.

In FIGURE, gas flow close/open valves 49, 70, 90 and 100 are closed. Igniters 36 and 38 are initially activated. These igniters cause the four gas generators 50, 96, 60 and 78, in dual gas generators 20 and 22, to be ignited. The ignited dual gas generators 20 and 22 produce hot gas. The hot gas from gas generator 50 passes through section 46 and through section 48 of gas distributor 12 and into integrated valve thrust assembly 28. Hot gas from gas generator 60 passes through sections 58 and 68 of gas distributor 14 into integrated valve thrust assembly 30. Hot gas from gas generator 78 passes through sections 76 and 84 of gas distributor 16 into integrated valve thrust assembly 32. Hot gas from gas generator 96 passes through sections 95 and 98 of gas distributor 18 into integrated valve thrust assembly 34.

The four gas generators 50, 60, 96 and 78 are activated during a first operational phase of the post boost control power assembly 6. These four gas generators continue to burn, with gas pressure in the sections 46, 48, 58, 68, 76, 84, 95 and 98, that are conducting gas, decreasing until the gas pressure decrease to a specified lower threshold pressure.

When this lower threshold gas pressure is reached, gas flow close/open valves 49, 70, 90 and 100 are opened, and igniters 40 and 42 are activated. Then, hot gas from gas generator 52 travels through section 44 of gas distributor 12, through gas flow close/open valve 49, and through section 48 of gas distributor 12, into integrated valve thrust assembly 28. Hot gas from gas generator 66 travels through section 62 of gas distributor 14, through close/open valve 70, through section 68 of gas distributor 14 and into integrated valve thrust assembly 30. Hot gas from gas generation 82 passes through section 80, through close/open valve 90 and section 84 of gas distributor 16, into integrated valve assembly 32. Hot gas from gas generator 94 passes through section 92, through close/open valve 100, through section 98 of gas distributor 18, into integrated valve thrust assembly 34.

The post boost control power assembly 6 of FIGURE provides hot gas to the four integrated valve thrust assemblies during two sequential time periods, each time period being greater than 340 seconds. The total boost control time period is greater than 680 seconds. The hot gas is produced by the controlled burning of any number of chemical compounds specifically designed for use in gas generators. The gas produced by burning such compounds is usually considered non toxic, non-corrosive and non-ablative.

A nozzle 120 of integrated valve assembly 28 is connected by a rigid hollow tube 122 to vent 123. Vent 123 passes through body 10 of missile 8. Similarly a nozzle 124 of integrated valve assembly 28 is connected by a rigid hollow tube 126 to a vent 127. Vent 127 passes through body 10 of missile 8.

When gas generator 50 is activated, gas flows from generator 50 through opened valves 160 and 162, through nozzles 120 and 124, through tubes 122 and 126, and through vents 123 and 127, when valve 49 is closed. When gas generator 52 is activated, and valve 49 is opened, gas flows from generator 52 through opened valves 160 and 162, through nozzles 120 and 124, through tubes 122 and 126, and through vents 123 and 127.

A nozzle 128 of integrated valve assembly 30 is connected by a rigid hollow tube 130 to vent 131. Vent 131 passes through body 10 of missile 8. Similarly a nozzle 132 of integrated valve assembly 30 is connected by a rigid hollow tube 134 to a vent 135. Vent 135 passes through body 10 of missile 8.

When gas generator 60 is activated and valve 70 is closed, gas flows from generator 60 through opened valves 164 and 166, through nozzles 128 and 132, through tubes 130 and 134, and through vents 131 and 135. When gas generator 66 is activated and valve 70 is opened, gas flows from generator 66 through opened valves 164 and 166, through nozzles 128 and 132, through tubes 130 and 134, and through vents 131 and 135.

A nozzle 136 of integrated valve assembly 32 is connected by a rigid hollow tube 138 to vent 139. Vent 139 passes through body 10 of missile 8. Similarly a nozzle 140 of integrated valve assembly 32 is connected by a rigid hollow tube 142 to a vent 143. Vent 143 passes through body 10 of missile 8.

When gas generator 78 is activated and valve 90 is closed, gas flows from generator 78 through opened valves 168 and 170, through nozzles 136 and 140, through tubes 138 and 142, and through vents 139 and 143. When gas generator 82 is activated and valve 90 is open, gas flows from generator 82 through opened valves 168 and 170, through nozzles 136 and 140, through tubes 138 and 142, and through vents 139 and 143, valve 90 being opened.

A nozzle 144 of integrated valve assembly 34 is connected by a rigid hollow tube 146. Hollow tube 14 is connected to a vent 147. Vent 147 passes through body 10 of missile 8. Similarly a nozzle 148 of integrated valve assembly 34 is connected by a rigid hollow tube 150. Hollow tube 150 is connected to a vent 151. Vent 151 passes through body 10 of missile 8.

When gas generator 96 is activated, gas flows from generator 96 through opened valves 172 and 174, through nozzles 144 and 148, through tubes 146 and 150, and through vents 147 and 151, valve 100 being closed. When gas generator 94 is activated, gas flows from generator 94 through opened valves 172 and 174, through nozzles 144 and 148, through tubes 146 and 150, and through vents 147 and 151, valve 100 being opened.

The teachings of U.S. Pat. No. 4,550,888, issued Nov. 5, 1985 are incorporated herein by reference. The integrated thruster valve assemblies 28, 30, 32 and 34 can be located outside of missile body 10, as indicated in FIG. 1 of U.S. Pat. No. 4,550,888.

While the present invention has been disclosed in connection with the preferred embodiment thereof, it should be understood that there may be other embodiments which fall within the spirit and scope of the invention as defined by the following claims.

What is claimed is:

1. A tubular distributor in a missile, comprising:
   (a) a right-angled hollow tubular first section, the right-angled hollow tubular first section comprising a first leg and a second leg;
   (b) a straight hollow tubular second section, an end of the first leg of the right-angled hollow tubular first section perpendicularly connected to a first end of the hollow tubular second section;
   (c) a straight hollow tubular third section, a first end of the hollow tubular third section perpendicularly connected to the first end of the straight hollow tubular second section, the hollow tubular third section being in line with the first leg of the right-angled hollow tubular first section, a hollow interior of the right-angled hollow tubular first section joined with a hollow interior of the straight hollow tubular third section, a hollow interior of the straight hollow tubular second section joined with a hollow interior of the straight hollow tubular third section; and
   (d) a close/open valve positioned within the straight hollow tubular third section, the close/open valve positioned between a gas generator and the straight hollow tubular second section.

2. A post boost control power assembly in a missile, comprising:
   (a) a right-angled hollow tubular first section, the right-angled hollow tubular first section comprising a first leg and a second leg,
   (b) a straight hollow tubular second section, an end of the first leg of the right-angled hollow tubular first section perpendicularly connected to a first end of the hollow tubular second section,
   (c) a straight hollow tubular third section, a first end of the hollow tubular third section perpendicularly connected to the first end of the straight hollow tubular second section, the hollow tubular third section being in line with the first leg of the right-angled hollow tubular first section, a hollow interior of the right-angled hollow tubular first section joined with a hollow interior of the straight hollow tubular third section, a hollow interior of the straight hollow tubular second section joined with a hollow interior of the straight hollow tubular third section;
   (d) a close/open valve positioned within the straight hollow tubular third section, the close/open valve positioned between a second gas generator and the straight hollow tubular second section;
   (e) a first gas generator connected to an end of the second leg of the right-angled hollow tubular first section;
   (f) an integrated thruster valve assembly connected to a second end of the straight hollow tubular second section; and
   (g) the second gas generator connected to a second end of the straight hollow tubular third section.

3. The post boost control power assembly of claim 2, the first gas generator being part of a first, dual gas generator, and the second gas generator being part of a second dual gas generator.

4. The post boost control power assembly of claim 2 and further comprising a gas flow close/open valve located within the hollow interior of the straight hollow tubular third section.

* * * * *